(12) United States Patent
Kim et al.

(10) Patent No.: US 6,232,696 B1
(45) Date of Patent: May 15, 2001

(54) VACUUM GENERATING APPARATUS WITH MULTIPLE ROTORS

(75) Inventors: Byung Kyu Kim; Joon Kim, both of Seoul (KR)

(73) Assignee: Amotron Co., Ltd., Kyungki-do (KR)

( * ) Notice: Subject to any disclaimer, the term of this patent is extended or adjusted under 35 U.S.C. 154(b) by 0 days.

(21) Appl. No.: 09/358,813

(22) Filed: Jul. 23, 1999

(51) Int. Cl.[7] .................... H02K 16/00; H02K 16/04
(52) U.S. Cl. .................. 310/268; 310/156; 310/63; 417/423.2; 417/423.7
(58) Field of Search .................... 310/89, 268, 62, 310/67, 156; 417/423.2, 423.7

(56) References Cited

U.S. PATENT DOCUMENTS

| | | | | |
|---|---|---|---|---|
| 1,911,471 | * | 5/1933 | Sacrey | 310/62 |
| 2,700,343 | * | 1/1955 | Pessillo, Jr. | 310/63 |
| 3,332,612 | * | 7/1967 | Gross | 310/268 |
| 3,867,656 | * | 2/1975 | Mitsui et al. | 310/68 |
| 4,187,441 | * | 2/1980 | Oney | 310/112 |
| 4,451,749 | * | 5/1984 | Kanayama et al. | 310/62 |
| 4,510,409 | * | 4/1985 | Kanayama | 310/268 |
| 4,922,162 | * | 5/1990 | Shiraki et al. | 310/268 |
| 5,892,307 | * | 4/1999 | Pavlovich et al. | 310/68 B |

* cited by examiner

*Primary Examiner*—Karl Tamai
(74) *Attorney, Agent, or Firm*—Rosenberg, Klein & Lee

(57) ABSTRACT

A vacuum generating apparatus for a vacuum cleaner is provided, in which an axial type coreless brushless direct-current (DC) motor is implemented in the form of a rotor-impeller integration structure. The vacuum generating apparatus includes an axial type brushless DC motor in which disc-shaped upper and lower rotors are symmetrically disposed facing the upper and lower portions of a disc-shaped stator at either end of a rotating shaft rotatably supported in the inner circumferential portion of the stator, upper and lower impellers integrally fixed in the upper and lower rotors, respectively, and upper and lower housings whose outer circumferential portions are combined with the outer circumferential portions of the respective disc-shaped stator such that air sucked via sucking inlets formed at the center of the housings is guided to a discharging outlet together with the stator. A single rotor structure can also be adopted.

3 Claims, 7 Drawing Sheets

VACUUM GENERATING APPARATUS WITH MULTIPLE ROTORS

BACKGROUND OF THE INVENTION

1. Field of the Invention

The present invention relates to a vacuum generating apparatus for a vacuum cleaner, and more particularly, to a vacuum generating apparatus for a vacuum cleaner in which an axial type coreless brushless direct-current (DC) motor is implemented in the form of a rotor-impeller integration structure, to thereby realize ultra-compactness, thinness, light-weight, low-noise, long lifetime, non-existence of carbon dust, and improved productivity.

2. Description of the Related Art

In accordance with development of electronics industry, a vacuum cleaner has become more compact, thinner and lighter. However, such reduction in size has confronted to a saturated state due to limitation of lengthy direction of a motor being an essential component in a vacuum cleaner.

In general, as the type of a vacuum cleaner, there are a traditional type as shown in FIG. 1, and an upright type and a canister type both of which are adopted in Europe. In all types of vacuum cleaners, compactness and lightness of the whole volume and weight are regarded as matters to be solved together with easiness of cleaning. In particular, in the case of an upright type of a vacuum cleaner, a big load is applied to hands during cleaning, to thereby cause much fatigue and inconvenience a user due to a large volume.

The structure of a conventional vacuum cleaner will be described below with reference to FIGS. 1 and 2.

In the conventional vacuum cleaner of FIG. 1, a motor 3 is incorporated in the inside of a housing 1 of a main body in which an impeller is fixed to a rotating shaft in order to generate a vacuum sucking force. Here, wheels 2 are rotatably installed on the lower portion of the main body. A dust bag 4 for accommodating dust is installed at the front stage of the motor 3. A dust sucking device 6 is detachably and attachably connected via a vacuum flexible hose tube 5 at the next end of the dust bag 4. A filter 7 is provided at the rear end of the housing 1.

In the conventional vacuum cleaner, the impeller is rotated due to driving of the motor 3, to thereby generate a sucking force. Accordingly, dust is absorbed into the dust bag 4 via the sucking device 6.

In a vacuum generating apparatus for a vacuum cleaner using a conventional alternating-current (AC) universal motor, as shown in a partially exploded sectional view of FIG. 2, both ends of a rotating shaft 8 of a rotor whose rotor coil 9 is wound around a core 9a are rotatably supported by bearings 10 and 20 fixed to a housing 16 of the motor 3. An electromagnet 11 for a stator is arranged with a predetermined gap along the external circumferential portion of th coil 9.

An impeller 12 is combined at the upper end of the rotating shaft 8 via an upper bearing 10 and a pair of washers 13 and fixed by a nut 14 and a fixing bolt 15.

Here, an electric power source for driving a motor is applied from a carbon brush 19 which is elastically supported on the housing 16 to the rotor coil 9 via a commutator 18 which is integrally formed on the lower side of the rotating shaft 8. Accordingly, a rotating magnetic field is generated to enable the rotor to rotate.

When the impeller 12 rotates, air is sucked via an upper-center hole 17 of the housing 16 and discharged via an outlet 16a which is located in the lower side of the housing 16 along the air stream in the direction of an arrow, to accordingly generate a vacuum sucking force in the inside of the housing 1 of the main body.

The conventional motor used for generating a vacuum sucking force increases air sucking noise generated during high-speed rotation according to an increase of an air output. The AC universal motor having the core type brush is limited in reduction of the axial length of the motor to accomplish compactness, thinness and light weight in view of the structure of the motor. Also, an air guide mechanism from sucking to discharging is formed by the impeller along the axial direction of the motor, which is not so simple that an output efficiency is lowered.

In case of the conventional structure, the impeller 12 and the rotor 9 are not integrated but separate, which require particular spacers, washers, nuts and bolts, etc., to combine them. Also, an air guide vane 21 is essentially required for guiding air from the impeller 12 to the discharging outlet 16a in order to increase an air pressure efficiently, which causes a complicated assembly to thus lower a productivity and increase a cost.

In the case of fabrication of the conventional impeller, a number of blades and upper and lower plates which are made of aluminium plate-type materials are combined up and down in order to maintain a mechanical strength and save a weight when the impeller rotates at high speed. Thus, an offset of a vacuum degree occurs according to a tightening degree between the combined upper and lower plates and the blades. As a result, during a press assembly, a tightening combination between the upper and lower plates and the blades is in pursuit of continuous improvement.

Furthermore, in the case of the structure adopting a carbon brush, carbon dust is scattered due to wear of the brush to thereby cause an environmental pollution. The worn-out brush should be replaced by a new one, to accordingly shorten a lifetime of the motor. Also, sparks are generated between the commutator and the brush and electromagnetic waves are radiated from the motor.

To solve the above problems in part, a twin impeller, an AC inverter motor, or a brushless type motor has been adopted, but those methods are not effective nor furthermore in progress due to limitation of the axial length (105.4 mm) in size of the motor and the weight (1.35 kg) thereof.

SUMMARY OF THE INVENTION

To solve the above problems, it is an object of the present invention to provide a vacuum generating apparatus for a vacuum cleaner in which an impeller and a rotor of an axial type coreless brushless direct-current (DC) motor is implemented in the form of an integration structure, to thereby realize ultra-compactness, thinness, light-weight, low-noise, long lifetime, non-existence of carbon dust, and improved productivity.

It is another object of the present invention to provide a vacuum generating apparatus for a vacuum cleaner having a rotor-impeller integration structure in which blades and a lower plate of an impeller are integrally molded as a rotor support body by means of an insert molding method together with a divided type magnet, a magnet holder and a magnet plate of a rotor, and an upper plate of the impeller is integrally combined with the blades of rotor support body by means of an ultrasonic fusion method, to thereby an improvement of productivity and tightening adhesiveness between the upper and lower plates and the blades.

It is the other object of the present invention to provide a vacuum generating apparatus for a vacuum cleaner in which an air guide vane is not essentially required for guiding air sucked by an impeller in the housing to an air discharging outlet, and an air guiding structure is simple and subject to receive an air resistance less.

To accomplish the above object of the present invention, there is provided a vacuum generating apparatus comprising: a stator located at the center, including a number of stator coils in a disc-shaped supporter integrally; a rotating shaft which is rotatably supported in the stator; upper and lower rotors spaced by a predetermined distance from the stator and disposed at the upper and lower sides of the stator, respectively, in which a plurality of N-pole and S-pole divided magnets are alternately arranged along the circumferential direction of the upper and lower rotors each forming a disc shape, such that the upper and lower rotors are rotated by means of an interaction with an electromagnetic force of the stator coils; upper and lower impellers fixed to the upper and lower rotors, respectively; and upper and lower housings whose outer circumferential portions are combined with the respective disc-shaped stator supporter such that air sucked via sucking inlets formed at the center of the housings is guided to a discharging outlet together with the stator supporter.

The upper and lower rotors each comprise: a plurality of N-pole and S-pole divided magnets; a disc-shaped magnet holder having a plurality of insertion holes through which the plurality of the divided magnets are inserted and a plurality of combining protrusions which are used in combination with the impellers; and a disc-shaped magnet plate located on top of the magnet holder and forming a magnetic circuit, in which a plurality of combining throughholes are formed, whereby the plurality of the combining protrusions of the magnet holder are inserted and fixed into fixing grooves formed on the lower plate of the impeller via the plurality of the throughholes of the magnet plate.

Also, a first assembly of the upper rotor and the upper impeller, and a second assembly of the lower rotor and the lower impeller, each comprise: a plurality of N-pole and S-pole divided magnets; a disc-shaped magnet holder having a plurality of insertion holes through which the plurality of the divided magnets are inserted; a disc-shaped magnet plate located on top of the magnet holder to form a magnetic circuit; a rotor supporter surrounding the magnet holder and the outer circumferential portion and the rear surface of the magnet plate; a plurality of blades formed integrally at the upper or lower surface of the rotor supporter and having a plurality of combining protrusions, respectively; and an upper plate on which a plurality of combining holes are formed to be in combination with the plurality of the combining protrusions of the blades, in which the rotor supporter and the plurality of the blades are integrally molded by an insert molding using engineering plastic.

In the upper and lower housings and the stator supporter, a diameter from the central axis to the outer circumferential portion gradually increases from a first point to a second point adjacent the first point, and a first outer circumferential portion of the first point and a second outer circumferential portion of the second point are extended in parallel, so that the discharging outlet is formed in an extension portion extended in parallel between the first and second outer circumferential portions.

It is preferable that the vacuum generating apparatus further comprises a plurality of air guide vanes integrally formed on the upper and lower surfaces of the stator supporter and extended by a certain distance along the direction of the centrifugal force, such that the air discharged from the upper and lower impellers is guided to a discharging outlet with discharging paths divided.

Also, the vacuum generating apparatus further comprises a plurality of throughholes formed on the upper and lower rotors in order to magnetically cool the stator coils.

According to another aspect of the present invention, a double impeller type vacuum generating apparatus comprises: an axial type brushless DC motor in which disc-shaped upper and lower rotors are symmetrically disposed facing upper and lower portions of a disc-shaped stator at either end of a rotating shaft rotatably supported in the inner circumferential portion of the stator; upper and lower impellers integrally fixed in the upper and lower rotors, respectively; and upper and lower housings whose outer circumferential portions are combined with the outer circumferential portions of the respective disc-shaped stator such that air sucked via sucking inlets formed at the center of the housings is guided to a discharging outlet together with the stator.

According to the other aspect of the present invention, a single impeller type vacuum generating apparatus comprises: an axial type brushless DC motor in which disc-shaped upper and lower rotors are symmetrically disposed facing upper and lower portions of a disc-shaped stator at either end of a rotating shaft rotatably supported in the inner circumferential portion of the stator; an impeller integrally fixed in any one of the upper and lower rotors; a plurality of connections vertically extended in the direction of the rotor side having no attached impeller from the outer circumferential portion of the disc-shaped stator, respectively; a lower housing whose lower surface is fixed in the other ends of the plurality of the connections and whose outer circumferential portion is extended to surround the motor, such that a diameter with respect to a first point in place gradually increases from the central axis to the outer circumferential portion and that the outer circumferential portion of the first point and the other outer circumferential portion of a second point adjacent the first point form a shape extended in parallel; and an upper housing whose outer circumferential portion is combined with the outer circumferential portion of the lower housing in shape corresponding to the lower housing, for guiding air sucked via the sucking inlet formed at the center thereof to a discharging outlet formed extended in parallel with the outer circumferential portion thereof.

The vacuum generating apparatus has a structure appropriate for being used in a vacuum cleaner, but can be applied to other apparatuses using vacuum.

As described above, the present invention utilizes an axial type brushless DC motor in which a rotor-impeller integration structure is realized, to accordingly optimize a space factor. The present invention attaches impellers to the upper and lower surfaces of double rotors, respectively, to thereby maintain the same vacuum degree and minimize the number of rotation of the motor in order to realize low noise of the set. As a result, ultra-compactness, thinness, light-weight, low-noise, long lifetime, non-existence of carbon dust, and improved productivity can be accomplished.

Further, engineering plastic is used for fabrication of impellers, in which blades and a lower plate of an impeller are integrally molded as a rotor support body by means of an insert molding method together with a divided type magnet, a magnet holder and a magnet plate of a rotor, and an upper plate of the impeller is integrally combined with the lower plate by means of an ultrasonic fusion method, to thereby an improvement of productivity and tightening adhesiveness between the upper and lower plates and the blades.

BRIEF DESCRIPTION OF THE DRAWINGS

The objects and other advantages of the present invention will become more apparent by describing in detail the structures and operations of the present invention with reference to the accompanying drawings, in which.

DETAILED DESCRIPTION OF THE EMBODIMENTS

Preferred embodiments of the present invention will be described in detail with reference to the accompanying drawings.

Figure 1:
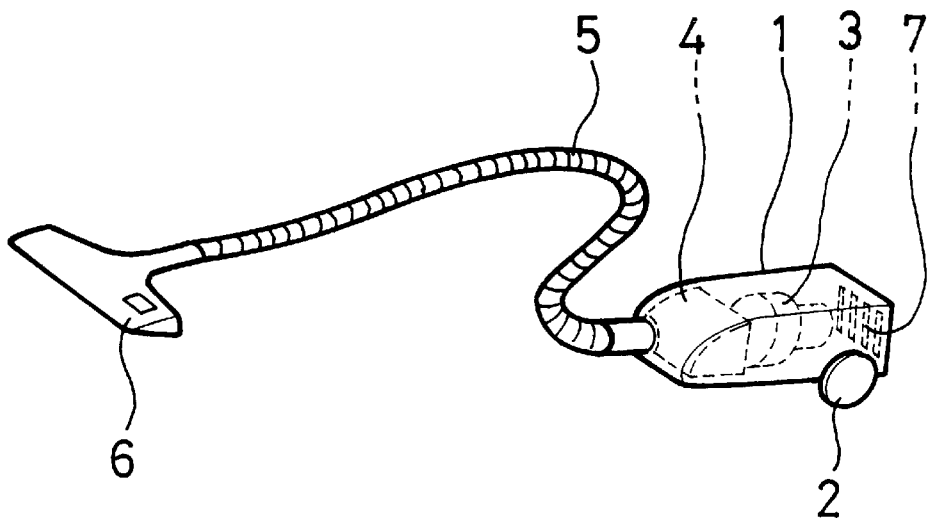
FIG. 1 is a perspective view showing a conventional vacuum cleaner.
Figure 2:
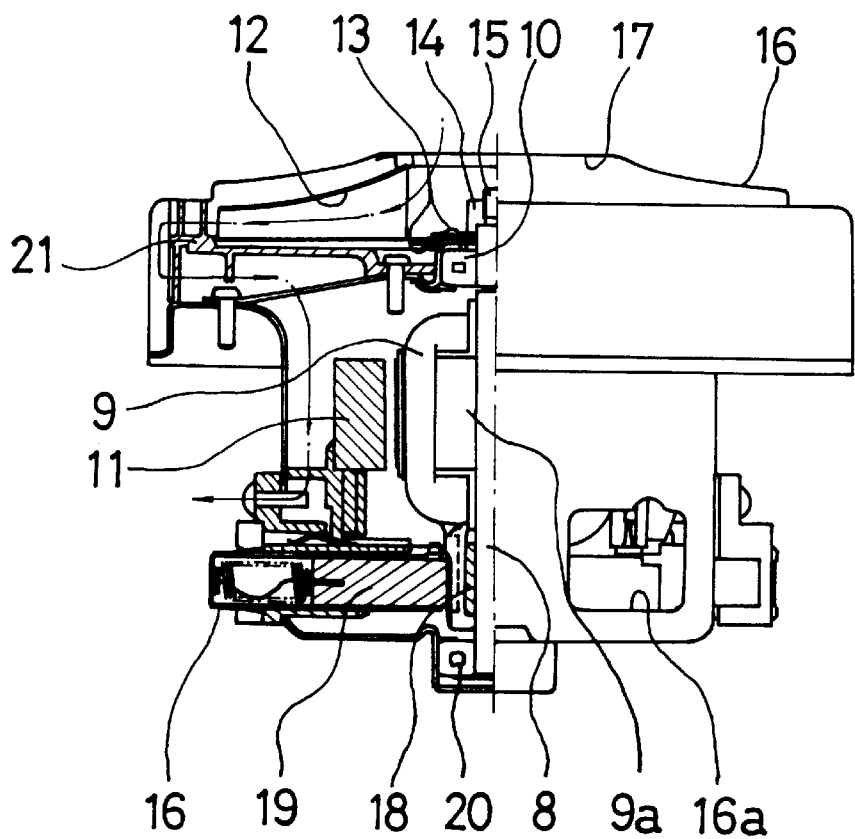
FIG. 2 is a partially exploded sectional view of a vacuum generating apparatus for a vacuum cleaner adopting a conventional AC universal motor.
Figure 3:
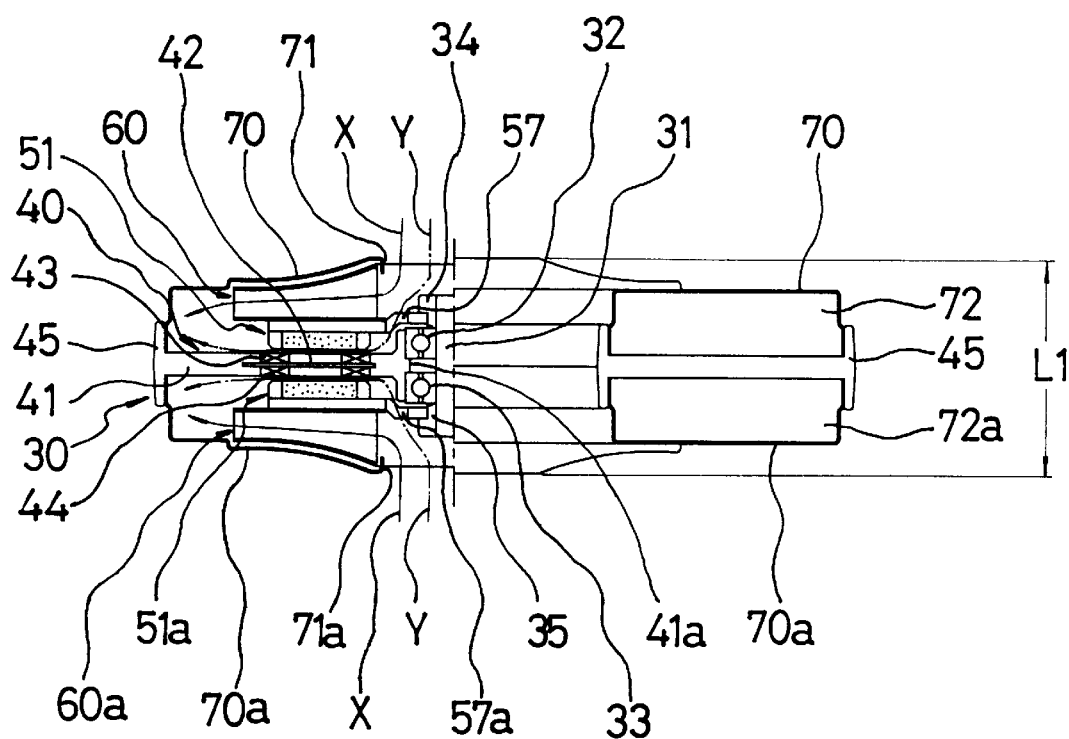
FIG. 3 is a partially exploded sectional view of a vacuum generating apparatus for a double-impeller type vacuum cleaner according to a first embodiment of the present invention.
Figure 4:
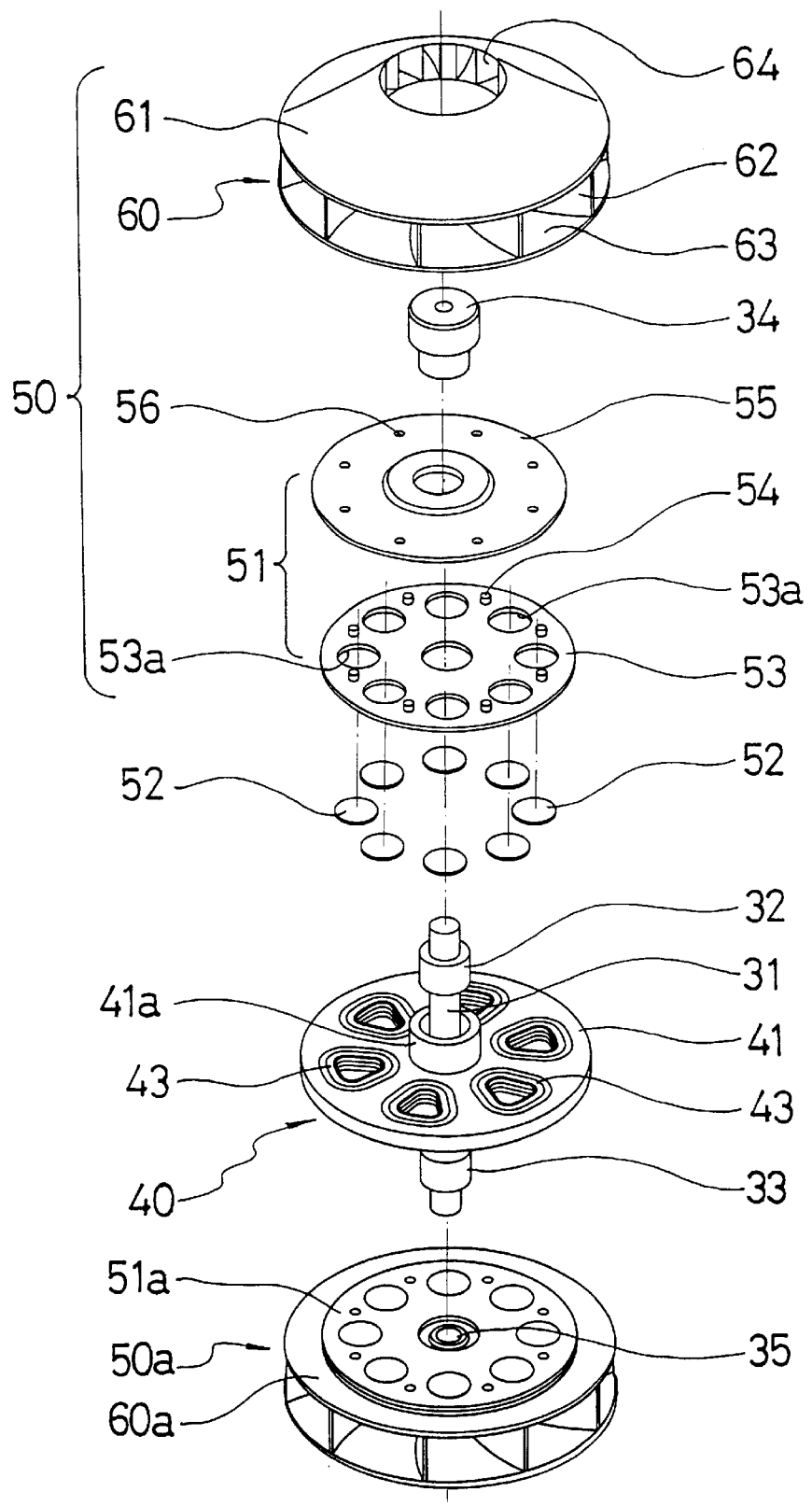
FIG. 4 is a disassembled perspective view of the state where upper and lower housings are removed in case of the first embodiment.
Figure 5:
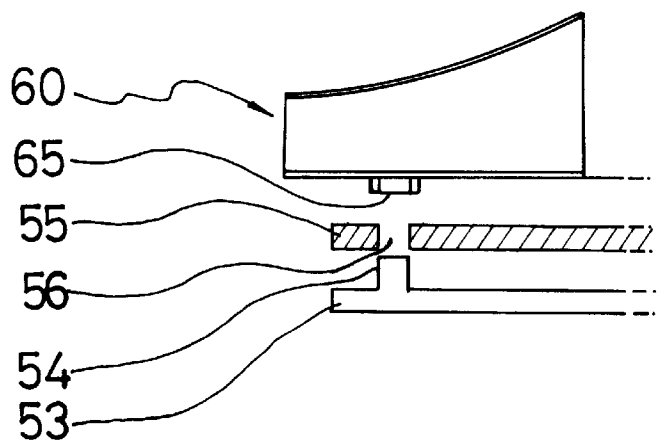
FIG. 5 is a sectional view showing a relationship in combination between a rotor and an impeller in the case that a separately fabricated impeller is used.

FIG. 3 is a partially exploded sectional view of a vacuum generating apparatus for a double-impeller type vacuum cleaner according to a first embodiment of the present invention. FIG. 4 is a disassembled perspective view of the state where upper and lower housings are removed in case of the first embodiment. FIG. 5 is a sectional view showing a relationship in combination between a rotor and an impeller in the case that a separately fabricated impeller is used.

First, referring to FIGS. 3 and 4, a vacuum generating apparatus for a double impeller type vacuum cleaner according to a first embodiment of the present invention uses a double rotor type motor as a basic structure among axial type coreless brushless DC motors which have been disclosed in the U.S. patent application Ser. No. 08/783,908 which was granted and whose issue fees were paid on Apr. 7, 1999 by the same applicant and modifies the double rotor type motor so as to be suitable for power source of the vacuum cleaner for generating a rotating force.

The vacuum generating apparatus of the present invention which including a modified motor 30 includes a single stator 40 located at the center, upper and lower rotors 51 and 51a which are fixed by bushings 34 and 35 to either end of a rotating shaft 31 which is rotatably supported in the stator 40 and disposed at the upper and lower sides of the stator 40, respectively, upper and lower impellers 60 and 60a which are fixed to the upper and lower rotors 51 and 51a, respectively, and upper and lower housings 70 and 70a combined with the stator supporter 41 forming the stator 40 such that the sucked air is guided.

In this case, the upper rotor 51 and the upper impeller 60, and the lower rotor 51a and the lower impeller 60a form an integral rotor-impeller assembly 50 and 50a which is rotatably supported with respect to the rotating shaft 31, respectively.

In more detail, the stator 40 has an integrally fabricated structure in which six bobbinless (or bobbin type) stator coils 43 are integrated in the disc-shaped stator supporter 41 by means of an insert molding method as shown in FIG. 4, in which case water-proof, vibration-absorption, corrosion-resistant, wear-resistant and electrical resistant features are improved. The number of the stator coils 43 can vary according to the number of magnets (or poles) of the rotors 51 and 51a, or a driving method of two phases or three phases.

The stator coils 43 are wound into a rectangular coil in which three coils are divided into six coils in the three-phase driving method, and wired in the Y form in a printed circuit board (PCB) 42 which will be described later. In case of a full-wave driving method of a two-phase driving, two stator coils are wound by eight coils and wired in serial manner.

Also, the stator coils 43 are insert-molded at the state fixed on both the surfaces of the PCB 42 as sown in FIG. 3. Otherwise, the stator coils 43 are wound as a single body as shown in FIG. 4, respectively, so that the single body can be molded at the state fixed to one surface of the PCB 42. In this case, the PCB 42 includes a Hall element for detecting rotational positions of the rotors 51 and 51a.

An annular protrusion 41a is formed in the middle of the inner circumferential portion of the disc-shaped stator supporter 41, so as to support a pair of ball bearings 32 and 33 spaced from each other. A rotating shaft 31 is rotatably supported with a stable structure with respect to a pair of the ball bearings 32 and 33 which are adjacent to each other. Thus, vibration can be absorbed even during high-speed rotation of the rotors 51 and 51a.

The upper and lower rotors 51 and 51a are made of the same structure. First, the upper rotor 51 has such a structure that a number of divided magnets 52 are inserted into an aluminium magnet holder 53 having a of a number of insertion holes 53a as shown in FIG. 4.

Also, a number of combining protrusions 54 are protruded on the magnet holder 53, and inserted into and fixed to fixing holes 65 of an upper impeller 60 which is combined to the upper portion via a number of throughholes 56 of the disc-shaped magnet plate 55 forming a magnetic circuit as shown in FIG. 5.

The upper impeller 60 shown in FIG. 5 is made of aluminum as a case that a separately fabricated general impeller is used, and has a structure that a number of blades 62 are fixed between an upper plate 61 and a lower plate 63 each having a central opening 64. The combining protrusion 54 can be formed integrally during molding the lower plate 63.

Thus, the present invention integrally combines the magnet plate 55 and the upper impeller 60 very simply and assuredly by means of a simple press work such as an air press, using a number of combining protrusions 54 formed in he magnetic holder 5, even when a conventional impeller is used. Also, an increase of the additional length is not caused due to mutual combination.

In addition, vibration can be minimized during high-speed rotation by tuning concentricity and verticality with a guide hole at the time of a press work. Furthermore, even when the rotor rotates at high speed, the divided magnets 52 can be prevented by the magnet holder 53 from being separated owing to the centrifugal force.

The lower rotor 51a has the same structure as that of the upper rotor 51. Also, the structure in which the lower rotor 51a is combined with the lower impeller 60a is same as the upper rotor 51 with the upper impeller 60.

Figure 7:
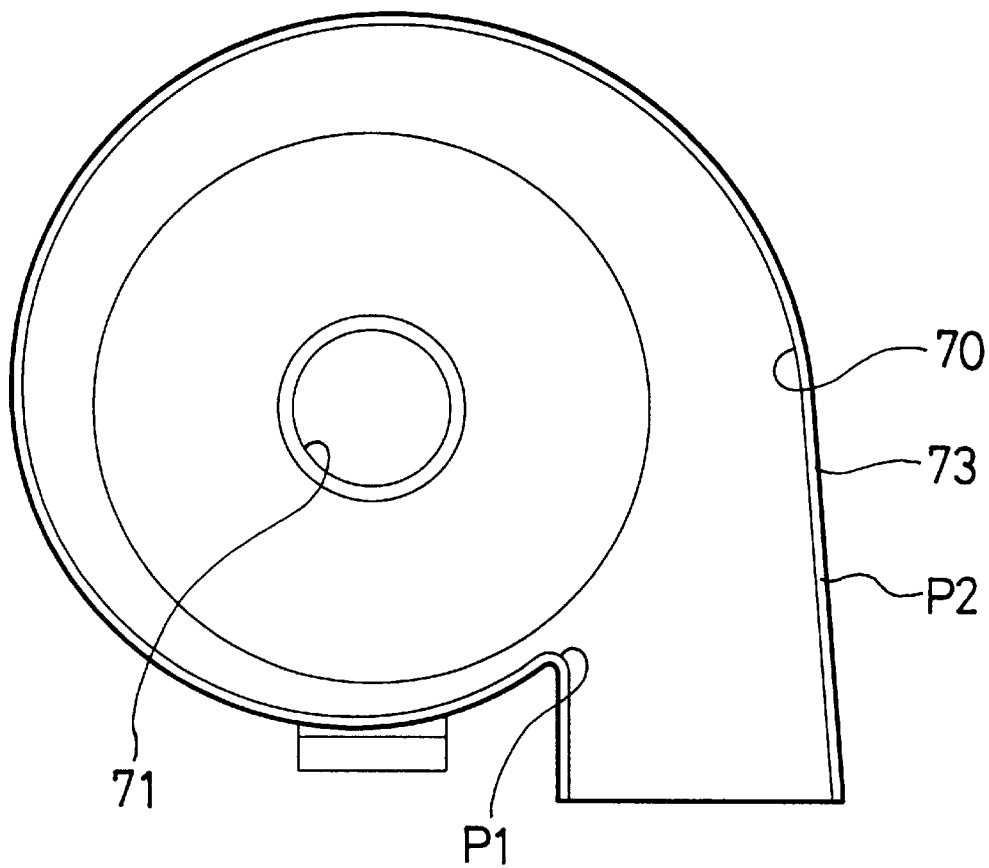
FIG. 7 is a plan view of the second embodiment.

Meanwhile, an extension 45 extended up and down is formed in the outer circumferential portion of the stator supporter 41. The external shape of the stator supporter 41 looks like a snail shell as shown in FIG. 7, in which a diameter gradually increases from a first point P1 to second point P2 adjacent to the first point P1 around the motor 30 and the impellers 60 and 60a both forming a cylindrical shape and then two lines are extended in parallel with each other at the first point P1 and the second point P2, respectively.

Air suction inlets 71 and 71a are formed in each center portion of the upper and lower inner sides of the extension 45, respectively, and combined with the outer circumferential portions of the upper and lower housings 70 and 70a forming a snail shell, respectively. The air suction inlets 71 and 71a play a role of guiding the sucked air to the discharging outlets 72 and 72a, respectively, according to rotation of the impellers 60 and 60a, together with the stator supporter 41.

A predetermined air gap is formed between the stator 40 and the lower rotor 51 or the upper rotor 51a, in which the stator 40 faces the lower or upper rotor 51 or 51a, in which case Fleming's left-hand rule is applied between the stator coils 43 and 44 and magnets 52 of the upper and lower rotors 51 and 51a, to thereby cause the rotors to rotate.

As the rotors 51 and 51a rotate, the upper and lower impellers 60 and 60a rotate. As a result, the air sucked through the suction inlets 71 and 71a forms a main air flow "X" along the solid line and a cooling air flow "Y" with respect to the stator coils 43 and 44 along the one-dot-one-line passing through throughholes 57 and 57a of the rotors, and then transferred along the inner wall of the upper and lower housings 70 and 70a owing to the centrifugal force and discharged to the discharging outlets 72 and 72a, as shown in FIG. 3. Thus, a self-cooling is performed with respect to the motor coils. Also, since air is discharged to the outside of the cleaner housings via the discharging outlets 72 and 72a, a vacuum state is generated in the inside of the housings in the vacuum cleaner including the vacuum generating apparatus.

Furthermore, the vacuum generating apparatus and the motor 30 form a symmetrical structure magnetically or physically on the whole, around the rotating shaft 31 or the stator 40.

In this case, the corresponding stator coils 43 and 44 of the stator 40 are set to have a winding direction and a current flow direction of the coils which attract or repel each corresponding magnet 52 of the upper and lower rotors 51 and 51a in the same force. Thus, the upper and lower rotors 51 and 51a are subject to receive the same attraction force or repelling force whose direction is reverse to that of the attraction force, by the stator 40. Accordingly, since the attraction force and repelling force applied to the rotors by the stator are offset from each other, axial vibration is minimized and thus noise generation is minimized and torque can be increased two times or more.

As a result, while noise is 100 dB(A) when it is measured at a distance from one meter in a conventional motor of 32,000 RPM, the present invention can reduce noise of at least 20 dB(A) when the same vacuum degree is maintained.

Since the vacuum generating apparatus according to the present invention adopts a motor of a double rotor structure, a driving torque increases by two times. Accordingly, the size of the motor is greatly reduced in comparison to the conventional motor having the same driving torque, to thereby achieve a compact structure, as well as accomplish a combination of the double rotor type motor 30 with the impeller 60 very simply, which enables an integration without causing an increase of an additional length due to mutual combination.

As a result, the vacuum generating apparatus according to the present invention enables the axial length (L1) to be reduced into 49 mm which is the one half of the conventional length of 105 mm, thereby enabling the vacuum cleaner to be reduced in size.

Furthermore, since the motor used in the present invention adopts a coreless brushless structure, the weight of the vacuum generating apparatus was 1.35 kg in the prior art but can be realized into 800 g in the present invention. The lifetime of the motor is about 200 hours at minimum in the conventional brush type but about 3000 hours in the present invention. The carbon dust problem has been removed automatically in the present invention.

Figure 6:
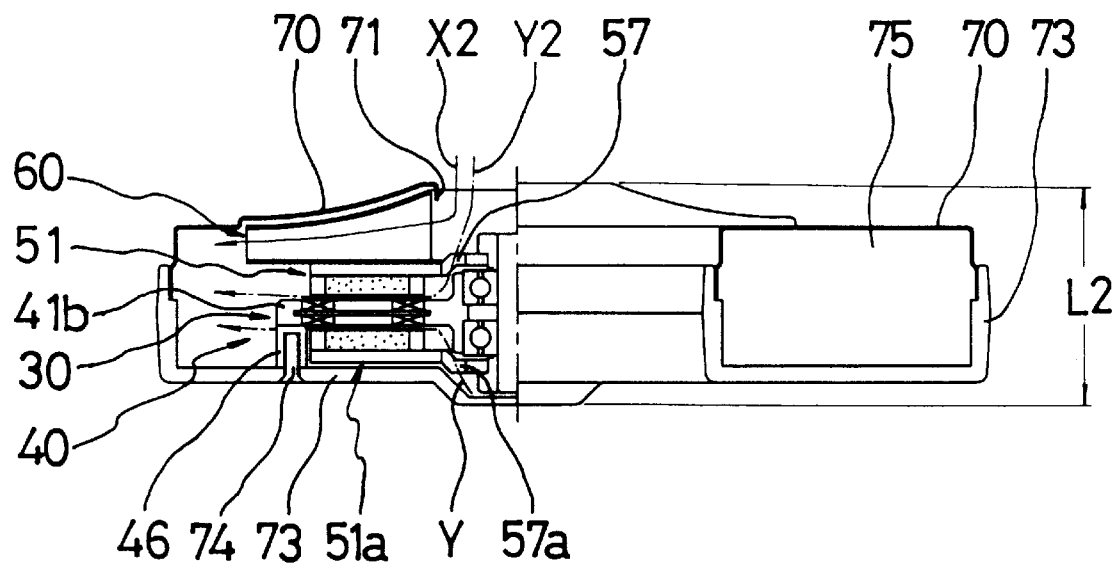
FIG. 6 is a partially exploded sectional view of a vacuum generating apparatus for a single-impeller type vacuum cleaner according to a second embodiment of the present invention.

Meanwhile, FIG. 6 is a partially exploded sectional view of a vacuum generating apparatus for a single-impeller type vacuum cleaner according to a second embodiment of the present invention. FIG. 7 is a plan view of the second embodiment.

The second embodiment adopts a single-impeller type differently from the first embodiment of the double-impeller type. In FIGS. 6 and 7, the same reference numerals are assigned to the same portions as those of FIGS. 3 through 5. Thus, the detailed description thereof will be omitted.

First, the motor 30 uses the same double rotor type coreless brushless DC motor as that of the fist embodiment, in which the single impeller 60 is installed in only the upper rotor 51, not in the lower rotor 51a.

Thus, the outer circumferential portion of the stator supporter 41b is not extended long as in the first embodiment in order to secure an inner space between the upper and lower housings 70 and 73, but a number of bosses 46 for combination with the lower housing 73 protrude toward the bottom surface. The stator supporter 41b is fixed to the lower housing 73 in which a fixing bolt 74 is engaged with the boss 46.

In this case, as the rotors 51 and 51a rotate, the impeller 60 rotates. As a result, the air sucked through the suction inlet 71 forms a main air flow "X2" along the solid line and a cooling air flow "Y2" with respect to the stator coils 43 and 44 along the one-dot-one-line passing through throughholes 57 and 57a of the rotors as shown in FIG. 6, and then transferred along the inner wall of the upper and lower housings 70 and 73 forming a snail shell as shown in FIG. 7 owing to the centrifugal force and discharged to the discharging outlet 75.

Since the second embodiment adopts a single impeller, the axial length (L2) becomes further reduced into 40.5 mm, and the weight is further decreased. The other features are similar to those of the first embodiment since the second embodiment operates in the same manner as that of the first embodiment.

Figure 8:
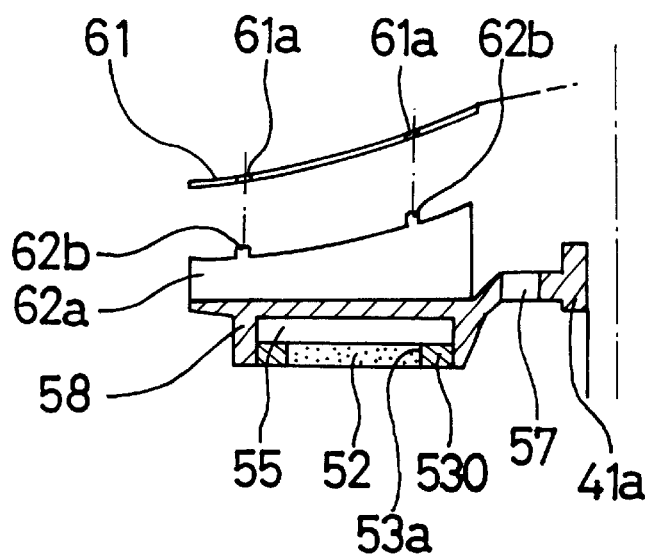
FIG. 8 is a sectional view showing a relationship in combination of a rotor-impeller integration structure using engineering plastic according to the present invention.

Meanwhile, in the case of the first and second embodiments, the impeller combined with the rotor has been fabricated separately and then integrated with a number of combining protrusions. However, the structure shown in FIG. 8 proposes an impeller-rotor integration structure.

That is, a number of divided magnets 52 are inserted into an annular aluminum magnet holder 530 having a number of insertion holes 53a and then an annular magnet plate 55 made of e.g., EGI (electro galvanized iron) is assembled on the upper portion of the magnet holder 530, and the side surface and upper surface of the magnet holder 530 are surrounded by an insert molding method using engineering plastic, e.g., PPS (polyphenylene sulfide), in which 7 to 9 blades 62a for forming the impeller are integrally formed on the upper surface.

In this case, two combining protrusions 62b used for being combined with the combining holes 61a formed on the aluminum upper plate 61 are formed on the upper surface of the blade 62a. When the upper plate 61 is combined with the blade 62a, they can be easily integrated by, for example, an ultrasonic fusion method at the state where the combining protrusions 62a have been inserted into the combining holes 61a of the upper plate 61.

In this structure, the rotor supporter 58 of the rotor 51 plays a role of a lower plate of the impeller 60 and the blade 62a is integrated with the rotor supporter 58. Accordingly, an assembly process is greatly simplified.

Figure 9:
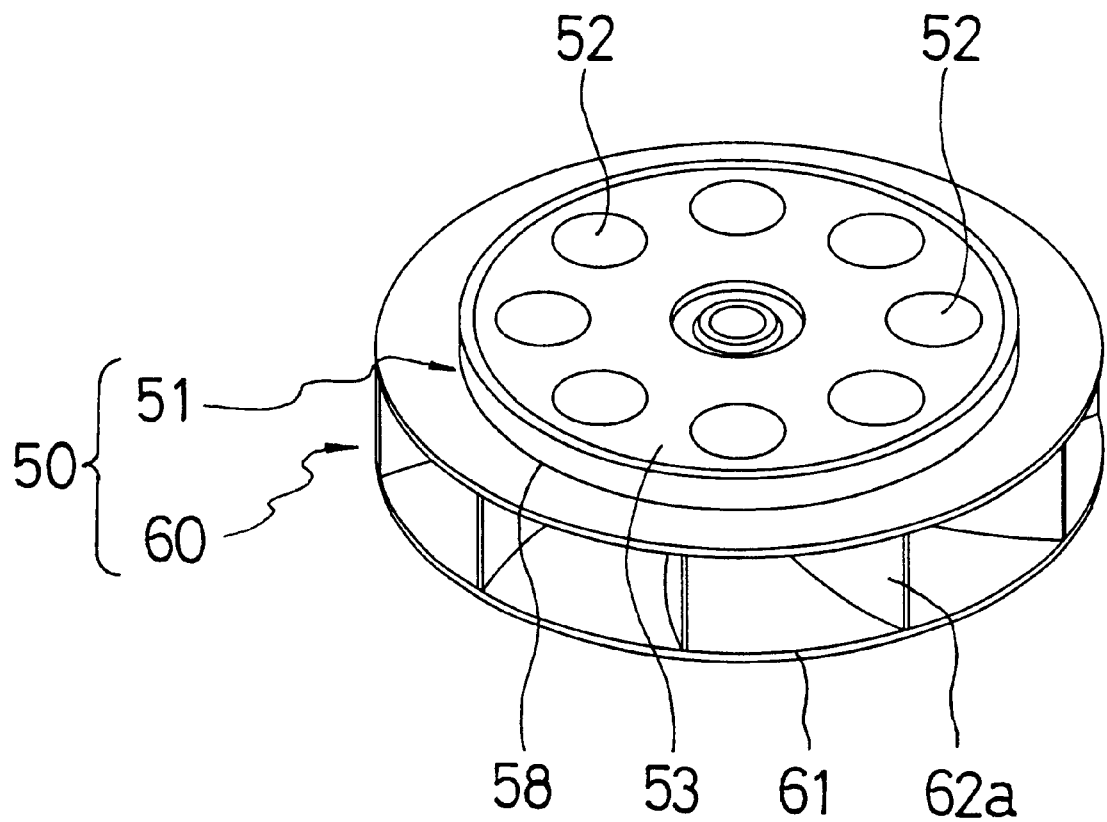
FIG. 9 is a perspective view showing a rotor-impeller integration structure.

The rotor-impeller integration structure which has been assembled according to the above-described method is made upside down and illustrated as a perspective view in FIG. 9.

As a result, the integral rotor-impeller assembly 50 provides a structure satisfying a mechanical strength and appropriate for high-speed rotation as a light body. Further, it is possible to optimize a space factor while completely solving a sealing problem between the upper and lower plates. Meanwhile, the vacuum generating apparatus according to the present invention can be applied to an upright and canister system as well as a general vacuum cleaner.

Also, in the above embodiments, an air guide vane is not essentially required for guiding air sucked by the impeller in the housing to an air discharging outlet, and the air discharged from the impeller does not pass through the inside of the motor and guided directly to the discharging outlet 72, 72a or 75. Accordingly, an air guiding structure is simple and a housing structure is subject to receive an air resistance less.

Further, the present invention provides a structure for guiding an air flow more effectively, that is, an air guide vane of a new structure different from the conventional air guide vane for guiding the sucked air from the upper portion of the housing to the discharging outlet of the lower portion.

Figure 10:
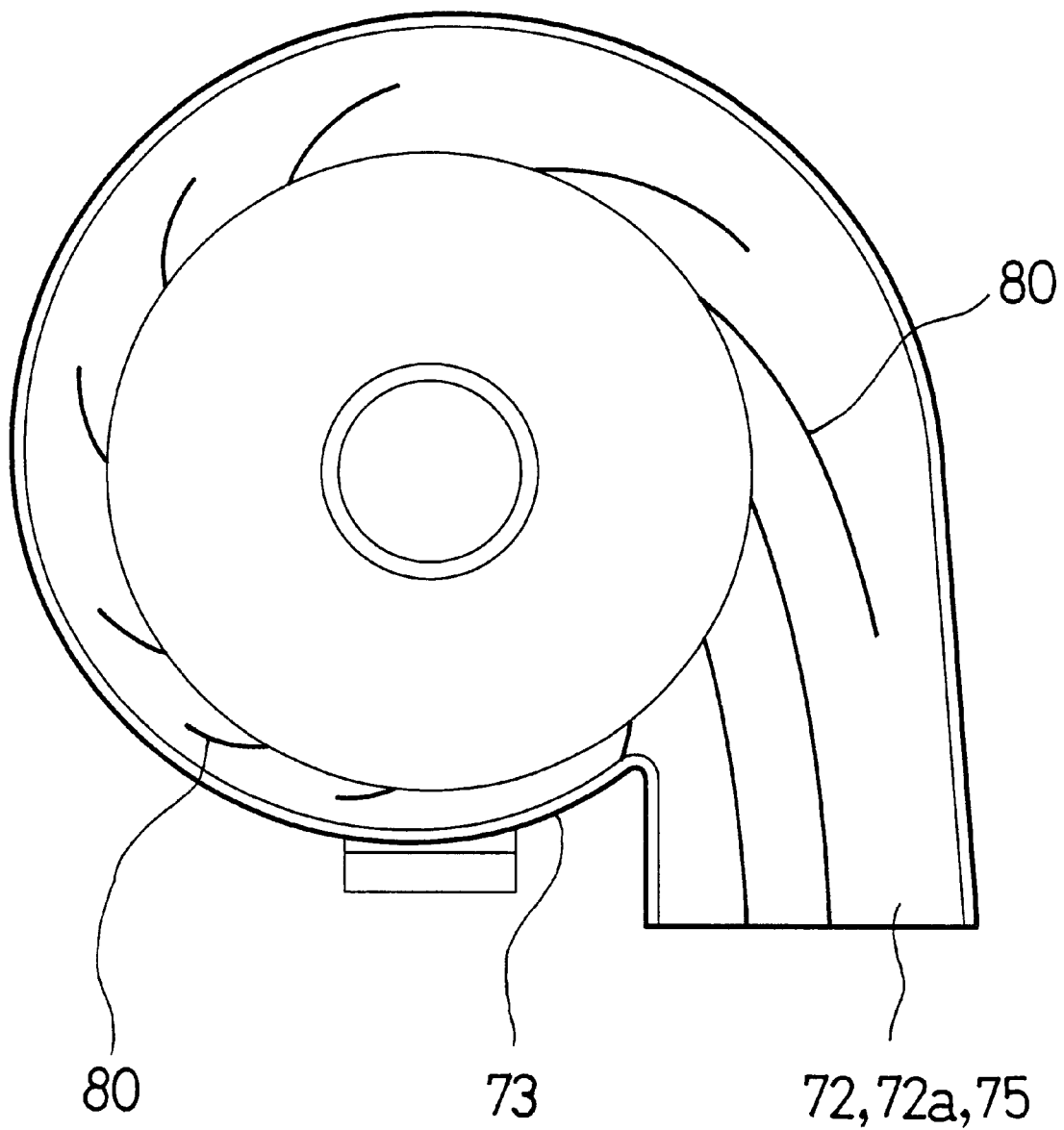
FIG. 10 is a plan view of a housing which can be used for the present invention.

Referring to FIG. 10, it is possible to integrally install a number of air guide vanes 80 to the stator supporter 41 of the first embodiment or the lower housing 73 of the second embodiment.

The vane 80 has a constant slope in the radial direction so as to be consistent with the air flow direction of the air discharged from the impeller 60 or 60a by the centrifugal force. The vane 80 is increased gradually in its length as it is closer to the discharging outlets 72 and 72a or 75. Thus, the vane 80 divides a limited space more effectively to induce an air flow when the sucked air is guided to the discharging outlets 72 and 72a or 75 according to the operation of the impeller 60 or 60a, to accordingly reduce air resistance.

As described above, the present invention utilizes an axial type brushless DC motor in which a rotor-impeller integration structure is realized, to accordingly optimize a space factor. The present invention attaches impellers to the upper and lower surfaces of double rotors, respectively, to thereby maintain the same vacuum degree and minimize the number of rotation of the motor in order to realize low noise of the set. Also, the structure employing a single rotor can be adopted in the present invention. As a result, ultra-compactness, thinness, light-weight, low-noise, long lifetime, non-existence of carbon dust, and improved productivity can be accomplished.

Further, engineering plastic is used for fabrication of impellers, in which blades and a lower plate of an impeller are integrally molded as a rotor support body by means of an insert molding method together with a divided type magnet, a magnet holder and a magnet plate of a rotor, and an upper plate of the impeller is integrally combined with the lower plate by means of an ultrasonic fusion method, to thereby an improvement of productivity and tightening adhesiveness between the upper and lower plates and the blades.

As described above, the present invention has been described according to preferred embodiments. However, the present invention is not limited to the particularly preferred embodiments. It is apparent to one skilled in the art that there are many various modifications and variations without departing off from the spirit or the technical scope of the appended claims.

What is claimed is:

1. A vacuum generating apparatus comprising:
   a centrally located stator having upper and lower sides, the stator including a number of stator coils integrally mounted in a disc-shaped supporter;
   a rotating shaft that is rotatably supported in the stator;
   upper and lower rotors spaced by a predetermined distance from the stator and respectively disposed at the upper and lower sides of the stator, the upper and lower rotors having a plurality of N-pole and S-pole magnets divided therebetween and alternately arranged along a circumferential direction of the upper and lower rotors, the upper and lower rotors being rotated by an interaction between the plurality of magnets and an electromagnetic force of the stator coils;
   upper and lower impellers respectively fixed to the upper and lower rotors, each of the upper and lower rotors having (a) a disc-shaped magnet holder having a plurality of insertion holes into which a respective portion of the plurality of magnets are received and a plurality of combining protrusions which are used in combination with the impellers, and (b) a disc-shaped magnet plate overlaying the magnet holder and forming a magnetic circuit, the magnet plate having a plurality of combining through holes formed therein, whereby the plurality of combining protrusions of the magnet holder are inserted and fixed into corresponding fixing grooves formed on a lower plate of a respective impeller through the plurality of combining through holes of the magnetic plate; and,
   upper and lower housings each having a centrally disposed suction inlet formed therethrough, the upper and lower housings having respective outer circumferential portions combined with the disc-shaped stator supporter such that air drawn through the suction inlets is guided to a discharging outlet through passages defined between each housing and the disc-shaped stator supporter.

2. A vacuum generating apparatus comprising:
   a centrally located stator having upper and lower sides, the stator including a number of stator coils integrally mounted in a disc-shaped supporter;

a rotating shaft that is rotatably supported in the stator;

upper and lower rotors spaced by a predetermined distance from the stator and respectively disposed at the upper and lower sides of the stator, the upper and lower rotors having a plurality of N-pole and S-pole magnets divided therebetween and alternately arranged along a circumferential direction of the upper and lower rotors, the upper and lower rotors being rotated by an interaction between the plurality of magnets and an electromagnetic force of the stator coils;

an impeller respectively fixed to one of the upper and lower rotors, the rotor connected to the impeller having (a) a disc-shaped magnet holder having a plurality of insertion holes into which a respective portion of the plurality of magnets are received and a plurality of combining protrusions which are used in combination with the impellers, and (b) a disc-shaped magnet plate overlaying the magnet holder and forming a magnetic circuit, the magnet plate having a plurality of combining through holes formed therein, whereby the plurality of combining protrusions of the magnet holder are inserted and fixed into corresponding fixing grooves formed on a lower plate of the impeller through the plurality of combining through holes of the magnetic plate; and, upper and lower housings having respective outer circumferential portions combined with the disc-shaped stator supporter for enclosing said upper and lower rotors and the impeller, the upper housing having a centrally disposed suction inlet formed therethrough such that air drawn through the suction inlet is guided to a discharging outlet.

3. The vacuum generating apparatus as recited in claim 2, wherein the lower housing has a plurality of air guide vanes integrally formed thereon and extending in a direction for respectively guiding air discharged from the impeller to the discharging outlet.

* * * * *